3,351,654
PROCESS OF PREPARING BIODEGRADABLE ALKYLBENZENE SULFONATES BY DIMERIZING AN OLEFIN OF 5 TO 10 CARBON ATOMS WITH A SILICA-ALUMINA CATALYST
David A. Gudelis, Sarnia, Ontario, Canada, assignor to Esso Research and Engineering Company, a corporation of Delaware
Filed May 19, 1961, Ser. No. 111,387
2 Claims. (Cl. 260—505)

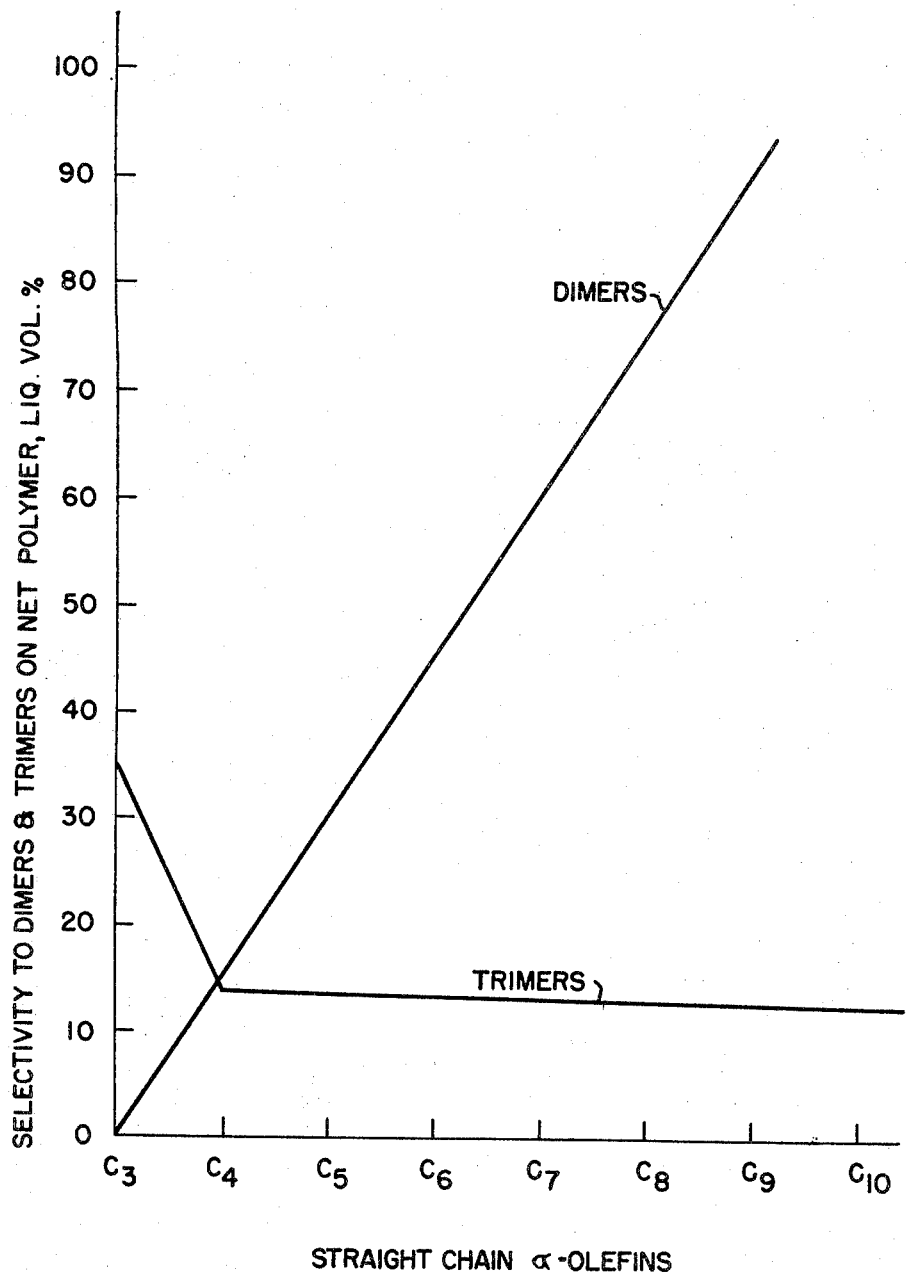

The present invention relates to an improved process for the selective dimerization and/or codimerization of $C_5$–$C_{16}$ monoolefins to $C_{10}$–$C_{32}$ monoolefins in the presence of a silica alumina catalyst. More particularly this invention relates to improved detergents prepared by alkylating benzene with selected fractions of the dimer and/or codimer olefins, so prepared, sulfonating and neutralizing to obtain alkyl benzene sulfonate detergents. Yet more particularly, in one preferred embodiment, this invention relates to dimerizing a $C_5$–$C_{12}$ olefin, preferably a $C_5$–$C_8$ olefin, obtained as a byproduct in the commercial preparation (i.e. by reacting propylene in the presence of a phosphoric acid on kieselguhr catalyst) of tetrapropylene for tetrapropyl benzene detergents. In another preferred embodiment, this invention relates to utilizing a $C_5$–$C_{10}$ predominantly straight chain alpha olefin stream from steam cracking or other sources as the feed to the present process, reacting the dimer and/or codimer olefin with benzene to obtain detergent alkylate and sulfonating and neutralizing to obtain a new biodegradable detergent.

According to the present invention in a preferred embodiment it has now been discovered that extremely selective dimerization of normally liquid monoolefins, e.g. $C_5$–$C_9$ olefins, under mild conditions may be obtained with a silica alumina catalyst. It has further been discovered that the higher molecular weight materials, within the $C_5$–$C_9$ feed range, e.g. $C_6$–$C_8$ olefins, produce essentially only dimerization and that cracking is suppressed and that further the presence of these higher olefins in a mixed olefin cut containing also lower olefins within the broad $C_5$–$C_9$ range also suppresses this cracking. This is particularly important (1) in obtaining an olefin product having a low cyclic olefin content (produced due to this cracking) since the presence of cyclic olefins greatly decreases the yields obtained on subsequent alkylation of benzene with these olefins and (2) in the preparation of biodegradable detergents from predominantly straight chain $C_5$–$C_9$ alpha olefins in preventing isomerization of the double bond inwardly in the dimer product molecule. It should be noted that the term "dimerization" used in the specification includes also codimerization and that some higher molecular weight trimers, etc. are formed as well as material boiling below the dimer and/or codimer due to cracking. It is also noted that olefin refers only to monoolefin.

In the embodiment of this invention wherein $C_5$–$C_{12}$ propylene polymer from phosphoric acid on kieselguhr polymerization is utilized, it has now been discovered that in addition to selectively obtaining higher molecular weight olefins, i.e. $C_{13}$–$C_{20}$ olefins, than are obtained from phosphoric acid polymerization (desirable since the detergents prepared from these olefins have superior washing properties to those prepared from lower molecular weight olefins) these olefins have a low cyclic olefin index.

In the embodiment of this invention wherein e.g. $C_5$–$C_{10}$ predominantly straight chain alpha olefins from e.g. wax cracking are dimerized, it has now been discovered that biodegradable detergents may be economically produced by the present process. This is surprising in that conventional liquid acid dimerization processes do not produce olefins which upon subsequent alkylation, sulfonation and neutralization result in fully biodegradable detergents. Although it is not intended that this invention be limited by any theory it is postulated that in the present process the active sites on the catalyst are so spaced with relation to the length of the chain of the feed olefin that growth type polymerization similar to AM polymerization is obtained. This dimerization may be represented for example by the following equation:

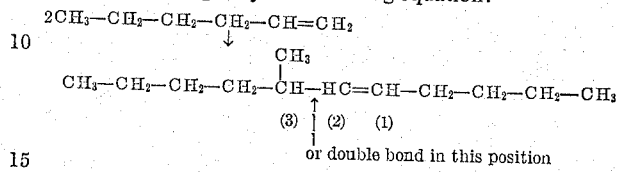

or double bond in this position

It is further postulated that the dimerized olefin has an internal double bond, which is stabilized by the methyl group, so that on alkylation only specific alkylate isomers are obtained. Thus, on alkylation the phenyl group will be attached on carbons 1, 2 and 3, preferably 3 producing alkyl benzene sulfonate detergents which are biodegradable. The discovery of the present economic process utilizing silica alumina catalysts greatly reduces the cost of these detergents.

As is well known, the problem of the poor bidegradability of conventional detergents (i.e. their inability to be removed in sewage disposal plants) is one of the prime problems today in detergent manufacture. The removal of detergent materials in sewage disposal plants so that the effluent from these plants does not introduce these active materials into rivers and streams is extremely important. Thus, severe fouling and foaming problems have been encountered in many countries due to the lack of "biodegradability" of conventional commercial detergents. It has now been discovered that the present material solves both of these problems and is easily and cheaply prepared.

Suitable feed stocks for use in the present process are of two types which will be discussed first with respect to those for the production of biodegradable detergents and then with respect to those for the production of $C_{13}$–$C_{20}$ detergents having superior washing properties.

With respect to the former, $C_5$–$C_{10}$ predominantly straight chain monoolefin streams obtained from commercial processes, such as both mild or severe steam cracking, may be used. Both selective fractions from this stream, e.g. $C_5$, $C_6$, $C_7$, $C_8$, $C_9$ streams and wider boiling fractions, preferably the latter may be used. Preferred combined fractions are $C_5$–$C_9$, $C_5$–$C_7$, and $C_5$–$C_8$ fractions. These fractions may also contain up to about 5 mol percent of $C_4$ olefins depending upon the fractionation technique employed. Paraffins and aromatics may also be present in these feed stocks since the paraffins do not react in the dimerization reaction while the aromatics will be removed due to alkylation on the heavy bottom products. Where these feed stocks contain diolefins and acetylenes, in a preferred embodiment these materials are removed by known methods such as extraction, hydrogenation, etc. to thereby increase the purity of the dimer product obtained.

In one embodiment preferred $C_5$–$C_{10}$ feed stocks are obtained from the low severity steam cracking of wax, petrolatum or a paraffinic gas oil. Temperatures of 1000–1200° F. and conversions to propene of 5 to 15 wt. percent are used to produce mainly $C_5$–$C_{16}$ monoolefins. It should be noted that in a preferred embodiment these olefins are obtained from low conversion steam cracking processes conducted in the vapor phase. The amount of steam utilized is not critical, in general 50–95 mol percent steam based on total feed plus steam being used. The olefins boiling in the $C_5$–$C_{10}$ range contain above 80 wt. percent, preferably about 85 wt. percent, straight chain olefins. Additionally these olefins are above 80 wt. percent alpha olefins.

In another embodiment preferred $C_5$–$C_{10}$ feed stocks are obtained by liquid phase thermal cracking a paraffinic feed stock of the type above described at temperatures of 800° F. to 1000° F., and conversions of fresh feed to lighter boiling products of 20 to 90 wt. percent. By such a process 40 to 60% of predominantly straight chain olefins are obtained, the remainder being paraffins and small amounts of diolefins. If desired, the olefins may be dimerized directly from the paraffins.

In another embodiment preferred $C_5$–$C_{10}$ feed stocks are obtained from the widely commercially used high conversion steam cracking of gas oils to produce commercially desirable $C_2$–$C_5$ olefins and diolefins as well as higher boiling materials. Temperatures of about 1250–1500° F., amounts of steam as above described and residence times to obtain conversion to propene of 20 to 80 wt. percent are used in this process. The monoolefins boiling in the $C_5$–$C_{10}$ range from the high conversion steam cracking process are preferably treated by extraction to remove aromatics. $C_5$–$C_{10}$ cuts obtained from the high severity cracking of various gas oils or naphthas contain generally above 20 wt. percent straight chain olefins and certain fractions obtained from paraffinic gas oils may contain as much as 60 wt. percent straight chain olefins, or even 80 wt. percent straight chain olefins. The amount of benzene present in a $C_6$–$C_7$ cut is e.g. 10 to 30 wt. percent Also suitable feed stocks may be obtained by an ethylene growth process in the presence of aluminum alkyls.

With respect to feed stocks for the production of $C_{13}$–$C_{20}$ olefins for superior higher molecular weight detergents, these feed stocks may be the low boiling polymer boiling below about $C_{12}$, preferably below about $C_{11}$, from a conventional phosphoric acid on kieselguhr polymerization process. Preferably $C_5$ to $C_{11}$ olefins, e.g. $C_5$ to $C_9$ olefins, may be supplied to the process of the present invention. It is noted that these byproduct materials from the conventional process are of little value other than as fuels, etc. and that recycle of these materials in the conventional phosphoric acid on kieselguhr process does not appreciably increase the yield of the $C_{13}$ to $C_{15}$ materials.

The silica-alumina catalysts which may be used in the present process contain a ratio of silica to alumina of 1:1 to 15:1 and preferably contain from 50 to 90% silica and from 50 to 10% alumina. In addition, small amounts, i.e. not more than 10% of other metal oxides such as iron and nickel may be present but are only coincidental in the success of the present process. These catalysts may be prepared by methods well known in the art such as by impregnating silica with alumina salts, by directly combining precipitated hydrated alumina and silica or by joint precipitation of alumina and silica from aqueous solutions of their salts. Following this initial step in the preparation of the catalyst the catalyst is washed, dried and heated to activate the catalyst. This heating of the catalyst is essential to obtain the desired structure and acidity of the catalyst for optimum activity and selectivity in the process. Thus, the catalyst is heated at temperatures in the range of 300 to 1500° F., e.g. 300–500° F., preferably 900 to 1100° F., e.g. 1000° F., preferably with hot air for times in the range of ½ to 25 hours, preferably 1 to 3 hours, e.g. 2 hours. Thus, surface areas of above 350 square meters/g., preferably above 450 square meters/g., e.g. 500 square meters/g. are obtained. It should be noted that these catalysts do not include the molecular sieve type catalysts.

The catalyst may be used either in the form of pellets for fixed or moving bed processes or in the form of powder for fluidized operations. Where the catalyst is used in the form of pellets, these catalysts may be prepared by pelleting to form preferably ⅛″ to ½″ pellets, e.g. ³⁄₁₆″ pellets, followed by heating as previously described to activate the catalyst.

The silica alumina catalysts used in this invention are preferably fresh catalysts but in addition may less preferably be "spent" or "equilibrium" cracking catalysts which have been used in the cracking of hydrocarbons, e.g. gas oils to produce lower boiling materials. These cracking operations are commercially conducted, e.g. at temperatures of 800 to 1200° F., e.g. 1070° F., and pressures of 10 to 500 p.s.i.g., e.g. 200 p.s.i.g. In these processes activity of the catalyst progressively decreases due to the accumulation of coke and other materials thereon. Such catalysts are ordinarily continuously regenerated in the process by burning off the deposited coke at temperatures usually of less than about 1150° F., e.g. 950° F., in a stream of air which may be diluted with an inert gas in order to control the rate of burning. Regeneration processes, however, do not completely restore the catalyst to its original activity and regeneration becomes progressively less effective. This effect is due in part to the deposition of foreign materials, principally metals or metal compounds on the catalyst which are not removed in the regeneration process. Additionally the surface area of the catalyst progressively decreases. When the cracking activity after regeneration has decreased from 70 to 50% of its original activity regeneration thereof is no longer feasible and the catalyst is referred to as "spent catalyst" and is discarded. Such catalysts ordinarily have surface areas of about 100 m.²/g. which surface areas are of course, far below optimum for the present process. Catalysts having an activity of above 50 to 70% of original activity are referred to as "equilibrium" catalysts and these catalysts may be used in the process (although of course surface area for these catalysts also will be low). A typical spent catalyst containing 87% $SiO_2$ and 13% $Al_2O_3$ when fresh may contain when "spent" 1 to 5% iron and 0 to 1% nickel as impurities. In this invention, however, the amount and nature of the metallic impurities is of little consequence.

According to the present invention reaction conditions in the dimerization and/or codimerization should be temperatures in the range of 200 to 500° F., preferably 300 to 400° F., e.g. 350° F., pressures of 200 to 150 p.s.i.g., preferably 300 to 800 p.s.i.g., e.g. 500 p.s.i.g., space velocities of 0.05 to 0.80 g.p.h./lb. of catalyst, preferably 0.08 to 0.25 g.p.h./lb. of catalyst, e.g. 0.20 g.p.h./lb. of catalyst. In a preferred embodiment the feed contains less than 0.10 mol percent water, preferably less than 0.07 mol percent water, e.g. 0.04 mol percent water. This may be obtained if necessary by drying the feed and/or catalyst after regeneration. The catalyst will ordinarily be regenerated after a catalyst life of about 50 to 100 gallons polymer/lb. of catalyst, preferably about 60 to 80 gallons polymer/lb. of catalyst, e.g. 75 gallons polymer/lb. of catalyst, e.g. 75 gallons/polymer/lb. of catalyst. This regeneration is conducted at temperatures in the range of 800 to 1500° F., preferably 900 to 1200° F., e.g. 1000° F. for contacting times of 2 to 20 hours, preferably 5 to 10 hours, e.g. 8 hours. Shorter times are, of course, used with the higher temperatures. This contacting is preferably conducted in the presence of an inert gas and if it is desired to burn off carbon also in the presence of air. The temperatures described above are desirable in order to obtain the preferred structure of the catalyst following regeneration.

Alkylation is carried out utilizing benzene or less preferably toluene, in the presence of a Friedel-Crafts type catalyst at temperatures in the range of −10 to 70° C., e.g. 10° C., for times of 5 to 60 minutes, e.g. 18 minutes. Preferred catalysts are, for example, $AlCl_3$, HF, $BF_3$ and $AlBr_3$, polyphosphoric acid, $H_2SO_4$ and aluminum chloride hydrocarbon complexes. The feed olefin for the alkylation reaction is obtained by fractionation from the product from dimerization and/or codimerization. This feed for the "biodegradable" detergents is preferably a $C_{10}$–$C_{17}$ olefin, more preferably a mixed fraction of $C_{10}$–$C_{17}$ olefins, e.g. a $C_{10}$–$C_{15}$ olefin fraction. The feed olefin for the superior higher molecular weight detergent is preferably a $C_{11}$–$C_{18}$ olefin, more preferably a mixed fraction of $C_{11}$–$C_{18}$ olefins, e.g. a $C_{11}$–$C_{15}$ olefin fraction.

It is generally desirable to maintain in the reaction mixture a volume ratio of aromatic hydrocarbon to olefin of at least 3:1, e.g. 5:1, although ratios up to 20:1 may be used.

In the case of utilizing catalysts such as $AlCl_3$, $BF_3$, etc. preferably $AlCl_3$, it is preferred to utilize in one embodiment mild conditions of 5 to 20° C., e.g. 10° C., and in another embodiment conventional conditions of 20 to 60° C., e.g. 45° C. In both of these embodiments weight ratios of olefin to catalyst are in the range of 30:1 to 10:1, e.g. 20:1. Additionally, in the case of the use of aluminum chloride an activator such as HCl may be added in an amount of from 15 to 40 wt. percent, e.g. 20 wt. percent, based on aluminum chloride.

In utilizing the liquid hydrogen fluoride catalyst it is preferred to use an acid to hydrocarbon reactants volume ratio of 0.1:1 to 1.0:1, e.g. 0.3:1 and temperatures in the range of 0 to 15° C., e.g. 10° C. The concentration of this catalyst may range from 85% to 100% HF by weight, its water content being maintained very low, e.g. no higher than 1 or 2% by weight, the remainder being dissolved hydrocarbon material.

The alkylated aromatic fraction is recovered from the alkylation reaction mass and is sulfonated in known manner, e.g. by contact with an excess of concentrated sulfuric acid, oleum, $ClSO_3H$, sulfur trioxide, etc. The sulfonation may be carried out at temperatures up to 60° C., preferably for oleum 15° C. to 60° C., e.g. 50° C. The acid concentration is preferably at least 97%. Acid up to 100% concentration and preferably oleum containing up to e.g. 20 wt. percent $SO_3$ or higher, may be employed. With higher acid concentration, lower reaction times are required, e.g. about 3 to 4 hours with 98% acid, about 2 hours with 100% acid, and preferably 0.5 to 1 hour, e.g. 0.7 hour, with oleum. Volume ratios of sulfuric acid to hydrocarbon may range from 0.8:1 to 1.25:1, a 1:1 ratio being suitable. The larger the ratio, the more inorganic sulfate will be present in the product following neutralization. In many cases, the inorganic sulfate is a desirable constituent of the finished detergent composition.

The sulfonation product mixture may be separated by "layering" to remove part of the excess spent acid before neutralizing or may be neutralized directly. When neutralized the sulfonic acids are thus converted to sulfonic acid salts and the excess sulfuric acid into sulfate. The neutralization may be carried out with any base or basic-reacting inorganic or organic substance. Thus, to produce sodium sulfonates, aqueous sodium hydroxide or sodium carbonates are suitably employed. Other alkali metal, alkaline earth metal, ammonium or amine salts may be similarly produced from the corresponding basic compounds. The neutralization is generally carried out by contact with basic aqueous solution at temperatures of from 20° C. to 70° C., those between 30° C. and 50° C., e.g. 50° C., being preferred.

The present invention will be more clearly understood from a consideration of the following examples.

EXAMPLE 1

Dimerization of straight chain alpha olefins over Si-Al catalyst. In this example and in the following examples the Si-Al catalyst had a surface area of above 400 m.$^2$/gm.

Catalyst: (12% $Al_2O_3$-88% $SiO_2$)

| Run No. | 1 | 2 | 3 | 4 | 5 |
|---|---|---|---|---|---|
| Feed | Propylene | Butene-1 | Pentene-1 | Hexene-1 | Octene-1 |
| Pres, p.s.i.g | 800 | 800 | 800 | 800 | 800 |
| Temp., ° F | 350 | 350 | 350 | 350 | 350 |
| Space vel., g.p.h./lb | 0.25 | 0.23 | 0.24 | 0.22 | 0.23 |
| Conv., wt. percent | 30 | 91 | 91 | 55 | 32 |
| Total polymer distribution, LV (liquid volume) percent: | | | | | |
| $C_5$ | | | 8.7 | | |
| $C_6$ | | 2.0 | 0.1 | 45.0 | |
| $C_7$ | 3.1 | 3.7 | 0.2 | 0.6 | 1.1 |
| $C_8$ | 5.7 | 16.0 | 0.3 | 0.7 | 66.9 |
| $C_9$ | 35.9 | 4.5 | 3.0 | 0.9 | |
| $C_{10}$ | 5.2 | 4.6 | 7.8 | 1.6 | |
| $C_{11}$ | 4.6 | 4.6 | 3.3 | 2.5 | |
| $C_{12}$ | 16.6 | 14.1 | 1.9 | 27.3 | 1.4 |
| $C_{13}$ | 4.2 | 4.3 | 3.1 | 1.7 | 0.1 |
| $C_{14}$ | 3.3 | 3.5 | 4.7 | 0.9 | 0.2 |
| $C_{15}$ | 7.4 | 4.1 | 11.9 | 0.9 | 1.3 |
| $C_{16}$ | 2.0 | 8.6 | 3.6 | 1.0 | 23.2 |
| $C_{17}$ | 1.6 | 3.4 | 0.5 | 1.3 | 0.1 |
| $C_{18}$ | 2.4 | 2.2 | 0.4 | 7.5 | 0.2 |
| $C_{19}$ | +8.0 | +24.4 | +30.5 | +8.1 | (+5.5) |
| $C_{20}$ | | | | | |
| $C_{21}$ | | | | | |
| $C_{22}$ | | | | | |
| $C_{23}$ | | | | | 0.3 |
| $C_{24}$ | | | | | 3.2 |
| $C_{24}+$ | | | | | 2.0 |

| Run No. | 1 | 2 | 3 | 4 | 5 |
|---|---|---|---|---|---|
| Net polymer distribution, LV percent: | | | | | |
| $C_6$ | (1) | (1) | 0.1 | | |
| $C_7$ | (1) | (1) | 0.2 | 1.1 | |
| $C_8$ | (1) | (1) | 0.3 | 1.3 | |
| $C_9$ | (1) | (1) | 3.3 | 1.6 | |
| $C_{10}$ | (1) | (1) | 30.4 | 2.9 | |
| $C_{11}$ | (1) | (1) | 3.6 | 4.5 | |
| $C_{12}$ | (1) | (1) | 2.1 | 49.6 | 4.4 |
| $C_{13}$ | (1) | (1) | 3.4 | 3.1 | 0.3 |
| $C_{14}$ | (1) | (1) | 5.1 | 1.6 | 0.6 |
| $C_{15}$ | (1) | (1) | 13.0 | 1.6 | 4.1 |
| $C_{16}$ | (1) | (1) | 3.9 | 1.8 | 72.5 |
| $C_{17}$ | (1) | (1) | 0.6 | 2.4 | 0.3 |
| $C_{18}$ | (1) | (1) | 0.4 | 13.6 | 0.6 |
| $C_{18}+$ | (1) | (1) | 33.4 | 14.7 | 17.2 |
| Ratio of true polymer to fragmentation products based on volumes (does not include recovered feed) | 1.67 | 0.81 | 1.09 | 2.02 | 3.94 |
| Hydrogen deficiency index: | | | | | |
| Dimers | | 2.7 | 7.1 | 8.1 | 10.6 |
| Trimer | 5.0 | 20.5 | 33.5 | 42.2 | |
| Tetramer | 19.6 | 34.2 | | | |

[1] Same as total polymer.

Thus, it can be seen (1) that the ratio of true polymer to fractionation products increases with increasing molecular weight, and (2) that the hydrogen deficiency index of the trimers is much higher than that of the dimers and that therefore with the present method of utilizing mixed feeds, low hydrogen deficiency indexes of the total product may be obtained. Thus, the accompanying figure describes the increased selectivity to dimer obtained with increasing molecular weight of the feed stock.

EXAMPLE 2

| Run No. | 1 | 2 |
|---|---|---|
| Feed | Pentene-2 | $C_9$ Olefin from Propylene Polymerization over Phosphoric Acid on Kieselguhr |
| Catalyst | 12% $Al_2O_3$- 88% $SiO_2$ | |
| P.s.i.g. | 800 | 800 |
| Deg. F. | 400 | 400 |
| G.p.h./lb. | 0.12 | 0.12 |
| Conversion, wt. percent | 87 | 30 |
| Yields LV Percent: | | |
| I-110° F. Feed | 14.0 | |
| 110-275 | 5 | |
| 275-325 Dimer | 27 | |
| 325-425 | 11 | |
| 425-475 Trimer | 17 | |
| 475+ | 26 | |
| Recovery $C_9$ (i-300° F.) | | 70 |
| 300-500 | | 8 |
| 500-550 Dimer | | 17 |
| 550+ | | 5 |

EXAMPLE 3.—DIMERIZATION OF RELATIVELY STRAIGHT CHAIN OLEFINS FROM MILD STEAM CRACKING OVER Si-Al CATALYST OPERATING CONDITIONS

Catalyst: (12% $Al_2O_3$-88% $SiO_2$)

| Run No. | 1 | 2 | 3 | 4 | 5 | 6 | 7 |
|---|---|---|---|---|---|---|---|
| Feed Fraction | $C_6$ | $C_6$ | $C_6$ | $C_7$ | $C_7$ | $C_8$ | $C_8$ |
| Hours on Condition | 26 | 11 | 8 | 20 | 6 | 21 | 8 |
| Pressure, p.s.i.g | 800 | 800 | 800 | 800 | 800 | 800 | 800 |
| Temperature, °F | 400 | 400 | 360 | 400 | 400 | 400 | 400 |
| LHSV., g.p.h./lb | 0.11 | 0.32 | 0.15 | 0.12 | 0.38 | 0.15 | 0.33 |
| Conv., wt. percent | 83 | 58 | 42 | 60 | 36 | 58 | 54 |
| Composition of net polymer by HVMS (high voltage mass spectrometer): | | | | | | | |
| $C_9$ | | | | 1.3 | 0.3 | 1.6 | 2.5 |
| $C_{10}$ | 6.6 | 5.0 | 4.8 | 1.4 | 0.2 | 0.7 | 0.5 |
| $C_{11}$ | 13.1 | 15.0 | 15.4 | 7.0 | 0.1 | 0.6 | 0.3 |
| $C_{12}$ | 21.5 | 30.4 | 27.4 | 13.8 | 5.0 | 0.4 | 0.2 |
| $C_{13}$ | 2.3 | 2.5 | 1.9 | 13.6 | 18.3 | 3.0 | 2.8 |
| $C_{14}$ | 2.9 | 0.3 | 0.1 | 15.1 | 23.8 | 6.4 | 7.9 |
| $C_{15}$ | 4.2 | 2.5 | 1.6 | 1.1 | 1.2 | 16.2 | 19.9 |
| $C_{16}$ | 5.4 | 5.8 | 9.5 | 0.6 | 0.1 | 13.4 | 15.9 |
| $C_{17}+$ | 44.0 | 38.5 | 39.3 | 46.1 | 51.0 | 59.7 | 50.0 |

EXAMPLE 4.— DIMERIZATION OF RELATIVELY STRAIGHT CHAIN OLEFINS FROM STEAM CRACKING OVER Si-Al CATALYST FIELD DATA

| Run No. | 1 | 2 | 3 | 4 | 5 | 6 | 7 |
|---|---|---|---|---|---|---|---|
| Feed | $C_6$ | $C_6$ | $C_6$ | $C_7$ | $C_7$ | $C_8$ | $C_8$ |
| Total polymer distribution, LV percent: | | | | | | | |
| $C_5$-170° F. Feed | 17 | 42 | 58 | | | | |
| 170-360° F. | 15 | 10 | 10 | | | | |
| 360-400° F Dimer | 18 | 20 | 11 | | | | |
| 400-500° F. | 15 | 9 | 6 | | | | |
| 500-550° F. Trimer | 5 | 6 | 4 | | | | |
| 550° F.+ | 30 | 13 | 11 | | | | |
| $C_5$-212° F. Feed | | | | 40 | 64 | | |
| 212-420° F. | | | | 19 | 6 | | |
| 420-460° F. Dimer | | | | 14 | 15 | | |
| 460° F.+ | | | | 27 | 15 | | |
| $C_5$-270° F. Feed | | | | | | 42 | 46 |
| 270-470° F. | | | | | | 7 | 8 |
| 470-530° F. Dimer | | | | | | 20 | 23 |
| 530° F.+ | | | | | | 31 | 23 |

EXAMPLE 5

Separate samples of typical $C_{10}$-$C_{17}+$ polymer fraction obtained from the processes described in Example 2, Run 2 and Example 4, Run 1 are used to alkylate benzene in the presence of an $AlCl_3$-HCl catalyst in a bench scale unit. Alkylation conditions are:

| | |
|---|---|
| $AlCl_3$ addition rate | 12 wt. percent on olefin. |
| HCl addition rate | 20 wt. percent on $AlCl_3$. |
| Benzene/olefin volume ratio | 5:1. |
| Reactor temperature | 50° F. |

The alkylates obtained are sulfonated with 20% oleum at 15–60° C. by adding the oleum to the alkylate. The weight ratio of oleum to hydrocarbon was 1.4:1 and the materials are reacted for 45 minutes. Following reaction, the sulfonation product mixture is neutralized to a pH of 7 with 30% aqueous sodium hydroxide to obtain the sodium salts of the sulfonic acids admixed with sulfates produced from excess spent sulfuric acid. The neutralization is carried out at temperatures of about 45° C. utilizing a reaction time of about 15 minutes.

It is to be understood that this invention is not limited to the specific examples, which have been offered merely as illustrations, and that modifications may be made without departing from the spirit of this invention.

What is claimed is:

1. A process for the preparation of biodegradable alkylbenzene sulfonates comprising contacting a hydrocarbon feed consisting essentially of straight-chain alpha-mono-olefin hydrocarbons of 5 to 10 carbon atoms with a silica-alumina catalyst having a weight ratio of silica to alumina of 1:1 to 10:1 at a temperature of 93–250° C. and at a pressure of 200 to 1500 p.s.i.g., fractionating the reaction product to obtain a dimer-containing fraction, subjecting said fraction to alkylation conditions in the presence of benzene and aluminum chloride and thereafter subjecting the resulting alkylbenzenes to sulfonation.

2. A process for the preparation of alklbenzene sulfonates comprising dimerizing a $C_5$–$C_{10}$ monoolefin in the presence of a silica-alumina catalyst having a weight ratio of silica to alumina of 1:1 to 15:1 at temperatures in the range of 200° to 500° F., pressures of 300 to 1500 p.s.i.g., and space velocities of 0.05 to 0.25 g.p.h./lb. of catalyst, fractionating the reaction product to obtain a dimer containing fraction, subjecting said fraction to alkylation conditions in the presence of benzene and aluminum chloride and thereafter subjecting the resulting alkylbenzenes to sulfonation.

References Cited

UNITED STATES PATENTS

| | | | |
|---|---|---|---|
| 2,198,937 | 4/1940 | Frey et al. | 260—505 |
| 2,381,198 | 8/1945 | Bailey et al. | 260—683.15 |
| 2,467,132 | 4/1949 | Hunt et al. | 260—505 |
| 2,470,171 | 5/1949 | Kennedy et al. | 260—683.15 |
| 2,487,564 | 11/1949 | Layng | 260—683.15 X |
| 2,507,864 | 5/1950 | Moore et al. | 260—683.15 |
| 2,622,113 | 12/1952 | Hervert | 260—683.15 |
| 2,806,875 | 9/1957 | Geiser | 260—505 |
| 2,820,056 | 1/1958 | Gerhart et al. | 260—505 |
| 3,009,972 | 11/1961 | Johnson | 260—683.15 |
| 3,098,884 | 7/1963 | Keith | 260—683.15 |

OTHER REFERENCES

Enjay: Higher Oxo Alcohols, 1957 (pages 4 to 6 relied upon).

Hammerton: J. Appl. Chem., vol. 5, September 1955, pages 517–524.

LORRAINE A. WEINBERGER, *Primary Examiner.*

L. ZITVER, *Examiner.*

B. M. EISEN, M. WEBSTER, *Assistant Examiners.*